United States Patent [19]

Anderson et al.

[11] Patent Number: 5,595,819
[45] Date of Patent: Jan. 21, 1997

[54] THIN POLYESTER FILM CONTAINING CUBIC CALCIUM CARBONATE PARTICLES SUITABLE FOR CAPACITOR, DIGITAL STENCIL AND THERMAL TRANSFER MEDIA

[75] Inventors: Virgil L. Anderson, Circleville, Ohio; Gusty Feyder, Dalheim; Cathy Vanderdonckt, Niederanven, both of Luxembourg; Albert W. Forrest, Jr., Chillicothe; Patrick H. Young, Amanda, both of Ohio

[73] Assignee: E. I. du Pont de Nemours and Company, Wilmington, Del.

[21] Appl. No.: 426,535

[22] Filed: Apr. 21, 1995

[51] Int. Cl.$^6$ ........................................................ B32B 5/16
[52] U.S. Cl. ............................. 428/330; 428/336; 428/480
[58] Field of Search ..................................... 428/323, 330, 428/480, 332, 336, 143, 148

[56] References Cited

U.S. PATENT DOCUMENTS 5,427,730  6/1995  Son et al. ............................. 264/235.8

FOREIGN PATENT DOCUMENTS 5-117443    5/1993   Japan .
5-339394   12/1993   Japan .
6-345947   12/1994   Japan .

*Primary Examiner*—Hoa T. Le

[57] ABSTRACT

Polyester film is disclosed having a thickness not greater than six microns with cubic calcium carbonate incorporated therein resulting in a $Kt^{-0.5}$ of at least 21, where K is a stack stiffness constant and t is film thickness in microns. The film exhibits excellent slittability and winding performance, providing film rolls of uniform hardness with sufficient compressive strength to avoid film buckling. The film can be employed in capacitors, digital stencils and thermal transfer media.

4 Claims, No Drawings

THIN POLYESTER FILM CONTAINING CUBIC CALCIUM CARBONATE PARTICLES SUITABLE FOR CAPACITOR, DIGITAL STENCIL AND THERMAL TRANSFER MEDIA

BACKGROUND OF THE INVENTION

The present invention is directed to thin biaxially-oriented polyester films having excellent handling performance during film slitting and winding with reduced film roll buckling defects and improved dielectric strength. Films of the present invention provide utility in thermal transfer media, digital stencils, and especially in capacitor applications.

Japanese unexamined patent application 6-34947 published Dec. 20, 1994, by Toray Industries discloses polyester compositions containing cubic calcium carbonate particles to obtain films with excellent sliding properties and wear resistance for magnetic tape applications.

Japanese unexamined patent 5117443 published May 14, 1993, by Maruo Calcium K. K. discloses the use of synthetic cubic calcium carbonate particles as antiblocking agents in synthetic resins including polyester films for magnetic tape applications.

Japanese unexamined patent 5339394 published Dec. 21, 1993, by Nittetsu Kogyo discloses the use of porous synthetic calcium carbonate particles having a calcite crystal structure with diameter from 0.1 to 2.0 microns and a specific surface area of 20 to 300 m²/g by BET as an additive for polyester films.

SUMMARY OF THE INVENTION

The present invention is directed towards thin polyester films of polyethylene terephthalate and polyethylene napthatate in a roll form, wherein the film has a thickness in a range from about two microns to six microns, wherein the film contains cubic calcium carbonate having an average diameter in a range of 0.2 to 3.0 microns and a concentration of 0.1 to 2 weight %, with the proviso the film has a $Kt^{-0.5}$ of at least 21, where K is the dimensionless stack stiffness constant and t is the film thickness in microns. Films of the present invention provide a combination of excellent handling performance, slittability and winding characteristics, producing film rolls of uniform hardness with sufficient compressive strength to avoid film buckling defects. The present invention is further directed to capacitors, digital stencils, and thermal transfer media containing such film as a substrate.

A preferred lower limit for film thickness in specific applications is 2.5 microns and more preferably 3 microns. Also in a preferred mode, the films of the present invention will have a surface roughness (measured by the Hobson Taylor Talysurf Model 5) of 0.05 to 0.15 microns.

In a preferred embodiment, the present invention is directed to a method of manufacture of a capacitor, digital stencil and thermal transfer media.

DETAILED DESCRIPTION OF THE INVENTION

Industry trends towards miniaturization have placed increasing stringent demands on polyester films with reduced film thickness. Electrical performance of capacitor films less than about six microns in thickness is degraded by damaging the film surface and additive impurities. High resolution imaging of digital stencil and thermal transfer media requires thin films having uniform surface topography which are contacted by the thermal print head. Thin films are particularly susceptible to winding defects such as creases, ridges, static impressions, wrinkles and the formation of stretch lanes which result in yield loss. Thin films less than six microns are susceptible to buckling defects when wound into film rolls since film stiffness decreases as the cube of the thickness. Buckling occurs within a film roll when compressive loading in the plane of the film layer exceeds a combination of inherent stiffness of the individual film layer and increased stiffness transmitted to the film layer by mechanical support from adjacent film layers. Buckling is evidenced by the formation of a sinusoidal pattern of ridges along the width of the film roll.

Thin films of polyester are preferably employed, particularly of polyethylene terephthalate, polyethylene naphthalate and copolymers thereof. It is understood that comonomer may be incorporated in these preferred polyester films such as up to 20% by weight of added comonomer including diols such as diethylene glycol, propylene glycol or cyclohexane dimethanol, aromatic diacids such as isophthalic acid and phthalic acid, and aliphatic diacids such as adipic acid and azeleic acid.

An important property of thin films is a stack stiffness constant, K, which is a measure of the resistance of stacked layers of film to compressive deformation. During film winding, a film layer is pressed by a lay-on roll onto a film roll formed of multiple film layers wound onto a rigid core. The surface topography of adjacent film layers provides channels for excess air to readily escape during winding (leaving a residual boundary layer of air) and serves as mechanical support for subsequent film layers in the film roll. The radial stress increases in the film roll as each added film layer squeezes the underlying film layers. The radial pressure within the roll causes compression in a transverse direction. The compressive stress formed in the transverse direction during winding is inversely proportional to the stack stiffness constant K, consequently a film roll formed from film with a higher K value has a lower level of compressive stress in the transverse direction. In addition, winding a film with a higher stack stiffness constant K results in a film roll that is stiffer in the radial direction and can withstand a higher compressive force in the transverse direction without buckling.

It has been discovered that introduction of cubic calcium carbonate provides an unexpected degree of film stack stiffness to resist deformation while providing a reduced level of thin film defects. Films of the present invention have a K value which meets the equation $Kt^{-0.5}$ of a least 21 wherein K is the stack stiffness constant and t is film thickness in microns.

The stack stiffness constant K is determined in accordance with the following test procedure: A two centimeter high cylindrical stack of film layers 6.35 centimeter in diameter is placed in a transparent plastic sample holder equipped with a vacuum ring, a lower test plate, an upper test plate providing for a stack compression area of 25.4 square centimeters against the test lower plate, and a position transducer. The film stack is evacuated to 725 mm Hg under 0.35 psi (2.4 KPa) loading for at least a minute after which an initial stack height is measured. The film stack is subsequently stepwise compressed within the range 0.1 mPa to 1 mPa between the test plates by addition of discrete loads allowing the stacked film sample to equilibrate at least five minutes between data points. The stack then decompressed in a stepwise manner to 0.1 mPa load. The compression and decompression cycles are repeated as required until the strains reproduce within 5%. Insufficient equilibration time results in erroneously high apparent values of the stack stiffness constant K as evidenced by poor reproducibility with greater than 5% variation in stack height readings at equivalent loadings for successive compression and decompression cycles. The final stack height data is converted to compressive strain. The dimensionless stack stiffness constant K is the slope of the plot log pressure vs strain above a pressure greater than 0.2 mPa.

Aging performance of film rolls is a key factor in the production and storage of thin films. All rolls of film entrain some air between the film layers during the winding process unless they are wound in a perfect vacuum. This entrained air is pressurized as the roll is formed by the increased radial stress caused by each wrap of film. After the roll has been wound, the entrapped air at elevated pressures leaks out through the ends of the rolls resulting in loss of radial stiffness in the wound film roll which can result in buckling defects. A film roll wound with film having a higher K value exhibits a higher stiffness in the radial direction and shows less collapse due to escape of pressurized air since the stiffer surface provides improved mechanical support of the film layers in a radial direction.

To obtain the required stack stiffness constant K, it is necessary to incorporate calcium carbonate particles having a cubic shape and an average particle diameter of 0.2 to 3.5 microns in a concentration range of about 0.1 to 2.0 wt %. A typical example has cubic calcium carbonate present in the film at a concentration of 0.34 wt % with an average particle size (D50) of 1.25 microns. In a preferred embodiment, films of the present invention have an average surface roughness, Ra, of at least 0.05 microns, generally in a range of 0.05 to 0.15 microns. A more preferred lower limit is 0.075 microns. This average surface roughness is by the Hobson Taylor Talysurf Instrument Model 5 as more fully described below.

The stack stiffness constant K decreases with thickness due to the lower inherent stiffness of each film layer. Therefore as the film thickness is decreased, it is necessary to employ a higher concentration of cubic calcium carbonate to provide more mechanical support between adjacent film layers in the stacked film to meet the equation $Kt^{-0.5}$ of a least 21. For the same reason, a higher concentration of cubes is required when the average particle size of the cube is decreased, for example, to reduce the thickness of the air layer between adjacent film layers in the film roll.

Synthetic cubic calcium carbonate particles are particularly preferred. Suitable synthetic cubic calcium carbonate particles are commercially available from Maruo Calcium Co Ltd (Hyogo, Japan). The cubes when observed by scanning electron microscopy have substantially equivalent edge lengths with flat faces. The cubes have a substantially calcite crystal structure as received and the structure remains unchanged by heat treatment in air for three hours at 300° C., as measured by x-ray. It is particularly preferred to use cubes which have been coated with a polymeric dispersing agent such as a copolymer of ammonium salt of acrylate and methoxy polyethylene glycol methyl acrylate to provide well dispersed particles which will have good polymer wettability.

Other conventional additives such as opacifiers and stabilizers also may be incorporated into the polyester films of the present invention including additive particles of smaller average diameter than the cubic calcium carbonate such as silica, alumina, kaolin, clays and in situ precipitated particles such as calcium phosphate as well as calcium carbonate. These secondary additive particles have an average particle size no greater than 0.5 microns and serve primarily as antiblocking agents to prevent two adjacent film surfaces from coming into intimate contact. Secondary additive particles can also be incorporated to reduce the thickness of the air layer entrapped between adjacent film layers during winding. No particular limitation is placed upon the chemistry, particle size, shape, or size distribution of the secondary additive particles so long as the secondary particles do not cause floccutation of the cubic calcium carbonate or result in the formation of weak agglomerates which would adversely impact the mechanical strength of the layered film.

The polyester resin can be manufactured by conventional melt polymerization, for example, reacting terephthalic acid, or alternatively, a dialkyl ester of terephthalic acid, especially dimethyl terephthalate, with ethylene glycol to form polyethylene terephthalate or naphthenoic acid or a dialkyl ester of naphthenoic acid, especially dimethyl-2,6-naphthalate, with ethylene glycol to form polyethylene naphthalate. Suitable catalysts include, but are not limited to, lithium, zinc and manganese for the ester exchange and antimony trioxide for the condensation polymerization. A phosphorus-containing compound such as phosphoric acid, phosphorus acid and phosphonic acid or their alkyl esters is preferably added after the first stage reaction as a thermal stabilizer to minimize color formation and to improve electrical properties.

The cubic calcium carbonate particles are added preferably in glycol after the esterification has been completed and prior to polymerization. The polymerization unit can be directly coupled with a film extrusion unit or, alternatively, the polymer can be formed into pellets for subsequent remelting and film extrusion. In particular, pellets containing a concentrated amounts of additive particles can be produced and subsequently dry blended with additive-free pellets to obtain the desired additive formulation suitable for the film. The amorphous film obtained by polymer extrusion through a film die is quenched and subsequently biaxially oriented using either a sequential or simultaneous process and heatset in a conventional manner prior to being slit and wound onto a core to produce a film roll.

The present invention is further directed towards a capacitor wherein the dielectric layer is polyethylene terephthalate or polyethylene naphthalate film of the present invention having a thickness of no more than six microns which contains cubic calcium carbonate having an average diameter in a range of 0.2 to 3.0 microns and a concentration of 0.1 to 2.0 weight % with the proviso that $Kt^{-0.5}$ is at least 21.

The capacitor can be manufactured in a conventional manner utilizing the film of the present invention as the dielectric layer which separates two electrically conductive layers which serve as electrodes. For example, an conductive electrode may be formed by metallizing a surface of the film such as by vacuum deposition of aluminum. The capacitor is produced by slitting and rolling the metallized film. The film can also be metallized on both surfaces in which case an unmetallized layer of film is placed adjacent one surface of the metallized film prior to winding again resulting a capacitor wherein electrodes separate each dielectric layer. Alternatively, the unmetallized film and an aluminum foil can be wound together to provide the capacitor. As conventional in the art of capacitor manufacture, the capacitor is heat set, optionally flattened and heat set again, and an electrical interconnect is formed to enable the internal electrodes to be electrically biased in use. The finished capacitor is typically encapsulated or otherwise packaged to facilitate handling without damage to the electrical interconnect.

The present invention is further directed towards a digital stencil comprising a laminate of a porous substrate and the polyester film of the present invention. The digital stencil is manufactured by bonding the polyester film to a porous substrate such as paper to form a laminate, for example by using a hot melt adhesive. The film may optionally be coated in a conventional manner either prior to or after lamination to the porous substrate with an antistick layer, such as a silicone release layer. The antistick layer prevents transfer of molten polymer from the stencil to the thermal printer head when the heated thermal print head contacts and perforates the polymer layer to expose the underlying porous substrate.

The present invention is further directed to a thermal transfer media wherein the polyester film of the present invention is used as a substrate having thereon a printing layer on one surface and an optional antitack layer on the opposing surface. The printing layer comprises a dye or pigmented component which is selectively transferred responsive to heat to an adjacent receptor substrate, for example, film, paper, or cardboard. For example, the surface of the thermal transfer media opposite the printing layer may be contacted with a thermal print head to facilitate transfer of the printing layer to the adjacent receptor substrate. The surface of the thermal transfer media opposite the printing layer optionally contains an antitack layer, such as a crosslinked thermal resistant release coating, to prevent fouling of the heated thermal print head.

The thermal transfer media is formed by coating one surface of the film of the present invention with a layer of an antitack composition and coating the opposing surface of the film with a layer of a printing composition.

An additional benefit of the present invention is the reduction in film defects. The number of defects in thin films in a thickness range from about two micron to six microns may be conveniently observed by determining the number of areas having a decreased dielectric breakdown strength. Although not bound by theory, the dielectric breakdown strength of thin films is believed to be degraded by film defects such as scratches and impressions from oversize particles introduced during film handling and winding as well as in the construction of the capacitor itself. The dielectric strength is also degraded by additive impurities. To minimize film defects it is believed that an additive system preferably exclude both excessive fine particles which may form agglomerates as well as oversize particles which contribute to scratches and compression defects on adjacent film layers during winding and capacitor manufacture. Furthermore, the number of defects introduced into an adjacent film layer in a film roll as a result of impressions due to cube edges and corners should be minimized. It is believed that a preferred orientation of the cubes at the surface of the film with a cube face substantially parallel with the film surface is obtained by decreasing the average particle diameter of the cube with decreasing film thickness. The use of cubic calcium carbonate as taught in the present invention is believed to minimize film defects by 1) stabilizing the residual boundary layer of air between adjacent film layers within a film roll, 2) providing uniform roll hardness, and 3) avoiding film buckling.

Particle size distributions were measured in ethylene glycol using a Malvern Mastersizer MS1005 (Malvern Instruments Inc, Southborough, Mass.) equipped with a small volume sample unit and recirculating slurry cell. The average particle size, D50, is the median volume equivalent spherical diameter. The particle sharpness index is the ratio of D90 to D10.and the span is the width of the distribution, D90 minus D10, divided DS0 where D90, DS0 and D10 are the particle size wherein 90%, 50% and 10% of the particles in the particle size distribution, respectively, are smaller in diameter. An equivalent surface area of spherical particles is determined based on the particle size distribution.

Films were analyzed using the following test methods:

Micrometer film thickness was determined as the average thickness of ten layers of film measured using a Mitutoyo Digital Mini Checker micrometer (MTI Corporation, Paramus, N.J.). A gravimetric thickness was calculated dividing the weight a 25 cm by 25 cm sample by its film density. A density of 1.395 g/cc was used for polyethylene terephthalate films as described in the attached examples.

The air layer thickness is defined as the difference between the micrometer film thickness and the gravimeteric film thickness.

The film roll hardness was measured using a Beloit Rho-meter (Beloit Corporation, Kalamazoo, Mich.).

The surface roughness was characterized using the Taylor Hobson Talysurf instrument Model 5 (Rank Precision Industries, Inc., Des Plaines, Ill.) by drawing a truncated pyramidal diamond stylus with a 1.3 micron by 3.8 micron tip at a force of 0.7 to 1 mg across the film surface. The cutoff value was 8 mm and the transversing length was 8 mm. The asperity density, the number of local asperities per centimeter of analyzed surface length, and the asperity height distribution were measured according to ISO procedure 4287 using eight scans per film sample. The Ra and Rz were calculated from the asperity profile wherein the Ra, the arithmetic mean of the absolute roughness profile, the Rz, the average value of the five maximum profile peaks and the five minimum profile valleys. The protrusion distribution index is the ratio of Rz to Ra. Rt is the maximum peak to valley height of the profile within the sampling length.

The maximum asperity height (MAH), the number of coarse protrusions per square millimeter, was determined by metallizing a film surface and counting the number of coarse protrusions greater than or equal to five interference fringes (about 1.4 micron in height) observed under a birefringence prism in a Hitachi interferometer in a film sample totaling at least 66.6 square microns in area.

The slide angle from the horizontal at which two film surfaces slide across each other (a measure of static coefficient of friction) was measured according to ASTM 1894.

The single sheet breakdown voltage was measured by placing an 8½ inch by 11 inch film sheet between two sheets of aluminum foil resulting in an electrode area of 300 square centimeters. The voltage was increased at a rate of 100 DC volts/second and dielectric breakdown was determined based on a threshold current of 0.2 milliamp for films less than 3.5 microns, 0.4 milliamps for films from 3.5 to 6 microns in thickness and 0.9 milliamps for films from 6 to 12 microns in thickness. The dielectric strength is reported as the average dielectric breakdown voltage per micron of film thickness for twenty samples.

The dielectric strength of film capacitors was tested according to the JIS standard using the average dielectric breakdown voltage per micron of film thickness for 100 capacitors tested at a ramp rate of 100 DC volts/second to failure (ASTM method 2318).

The number of film defects was characterized by counting the number of dielectric breakdown failures per area at specified voltages. A roll of five micron thick aluminum foil and a roll of film slit to a width two to five millimeters larger than the foil are superimposed such that a narrow margin of film protrudes over both edges of the foil. The rolls are unwound at a constant velocity of two meters per minute such that the film passes over a bar (having a contact area of 15 mm per mm of film width) which is maintained at a constant DC voltage. At a specified DC voltage (lower than the voltage corresponding to the average dielectric strength of the film), defect areas in the film fail as the film and the aluminum foil counterelectrode pass the voltage bar. The number of failures at the specified DC voltage is counted electronically and reported in number per square meter of film.

Winding characteristics of the film roll were evaluated according to the following scale.

O Roll surface free of wrinkles, ridges, creases, static marks and static impressions. Mirror-like surface appearance of roll. Uniform edge winding surface. Single sheet appears flat with no tension.

— Roll surface almost free of wrinkles, ridges, creases, static marks and static impressions. Slight non-uniform edge winding. Single sheet appears flat under moderate tension.

X Surface had wrinkles, static marks, static impressions, ridges and creases. Edge winding was non-uniform. Single sheet appears flat only under high tension.

NOTE: Any single roll defect resulted in a lower rating. The processability is defined as a yield rate of slit rolls Grade 1>85%

Grade 2 between 85% and 70%

Grade 3 between 50% and 70%

Grade 4 between 25% and 50%

Grade 5<25%

In the following examples all percentages and parts are by weight and degrees in Centigrade unless otherwise noted.

EXAMPLE 1

The particle size distribution of ethylene glycol slurries containing cubic calcium carbonate identified as Cube 13 (Maruo Calcium K. K.) and conventional glass bead milled tricalcium phosphate (TCP) additive, respectively, were tested using a Malvern Mastersizer MS1005. An ideal monomodal particle size distribution would have a sharpness index of 1.0. Cumulative particle size data showed a narrower size distribution of the synthetic calcium carbonate cubes with the absence of oversized particles. No particles 5.2 microns or larger were observed for the sample of cubes, while 4.5% of the milled tricalcium phosphate was larger than 5.2 microns and 1.0% was larger than 8.04 microns. No particles smaller than 0.3 microns were observed for the cubes while 4.6% of the milled tricalcium phosphate was less than 0.3 microns in diameter.

|  | cubic calcium carbonate | milled tricalcium phosphate |
|---|---|---|
| equivalent surface area (m²/gm) | 5.20 | 6.69 |
| D50 (microns) | 1.25 | 1.46 |
| Sharpness Index | 2.4 | 10 |
| Span | 0.9 | 2.5 |

EXAMPLE 2

Polyethylene terephthalate was prepared according to a continuous melt polymerization process by esterification of dimethylterephthalate with ethylene glycol using zinc acetate as the ester exchange catalyst. After the ester exchange reaction, a phosphorus thermal stabilizer compound, antimony trioxide as polymerization catalyst and the additive system as a slurry in ethylene glycol were added. For example, 0.38 wt % of 1.25 micron cubic calcium carbonate, Cube 13 (Maruo Calcium K. K., Japan) was employed as a 6 weight % slurry in ethylene glycol. Polycondensation was then completed at an elevated temperature in a vacuum according to conventional means yielding polyethylene terephthlate polymer with an intrinsic viscosity of 0.56 as measured in trichloroethane/phenol. The polymer was extruded through an extrusion die to form a film, quenched and biaxially oriented stretching sequentially in the machine direction and then in the transverse direction and subsequently heat treated, cooled, and wound onto rolls. Film performance properties are listed in Tables 1 and 2. Films shown in Table 3 contain a bimodal additive system wherein during the polymer manufacture each additive was incorporated by addition of a separate glycol slurry. These films were prepared by a film manufacturing process using simultaneous biaxially stretching rather than sequential stretching in the machin and transverse dirtections.

In Table 1, the 2.5 micron thick films containing cubic calcium carbonate have a higher average roughness (Ra) accompanied by a higher slip angle than film in containing 0.65 wt % milled tricalcium phosphate (comparative sample 1) even though the concentration and average particle size of the cubic calcium carbonate is lower. The more uniform surface roughness of the cubic calcium carbonate compared to the tricalcium phosphate is further exemplified by the lower protrusion distribution index and decreased number of large asperities as indicated by the MAH value when comparing films of comparable thickness. While Comparative sample 3 employing 0.55 wt % of milled tricalcium phosphate with a decreased average particle diameter of 0.5 also exhibits a low protrusion distribution index and MAH value, the surface roughness Ra is only 0.018 resulting in poor windability. Furthermore, the dielectric strength of this sample is degraded by the use of excessive fine particles.

Films containing cubic calcium carbonate (application samples 1 and 3) also showed fewer defects at specific voltage levels and improved dielectric strength both in the single sheet test of film and when tested as a film foil capacitor compared to comparative sampled 1 which contains milled tricalcium phosphate. When a narrower particle size distribution of milled tricalcium phosphate was employed as the additive system (comparative sample 2), as indicated by the sharpness index, the windability of the films was poor.

TABLE I

| | FILM PROPERTY COMPARISON | | | | | |
|---|---|---|---|---|---|---|
| Sample | App. 1 | App 2 | App. 3 | Comp. 1 | Comp. 2 | Comp. 3 |
| Nominal Film Thickness μ | 2.5 | 2.5 | 2.5 | 2.5 | 2.5 | 3.0 |
| Additive Type | CaCO₃ | CaCO₃ | CaCO₃ | TCP | TCP | TCP |
| D50 μ | 1.25 | 1.25 | 1.25 | 1.46 | 3.02 | 0.50 |
| Sharpness Index | 2.4 | 2.4 | 2.4 | 10 | 3.5 | 5.6 |

TABLE I-continued

FILM PROPERTY COMPARISON

| Sample | App. 1 | App 2 | App. 3 | Comp. 1 | Comp. 2 | Comp. 3 |
|---|---|---|---|---|---|---|
| Additive Loading WT-% | 0.52 | 0.27 | 0.34 | 0.65 | 0.11 | 0.55 |
| Surface Roughness | — | — | — | — | — | — |
| Ra - μm | 0.100 | 0.063 | 0.086 | 0.060 | 0.046 | 0.018 |
| Rz - μm | 0.800 | 0.740 | 0.890 | 0.830 | 0.830 | 0.162 |
| Rt - μm | 0.950 | 0.950 | 1.000 | 1.140 | 1.290 | 0.238 |
| Protrusion Distribution Index (Rz/Ra) | 8.0 | 11.7 | 10.3 | 13.8 | 18 | 9.0 |
| Asperity Density No./CM | 464 | 323 | 314 | 520 | 157 | 424 |
| MAH No./CM$^2$ | 290 | 285 | 132 | 870 | 1050 | 15 |
| Air Layer μ | 0.50 | 0.19 | 0.40 | 0.28 | 0.33 | — |
| Slip - Degree | 35 | 37 | 38 | 27 | 60 | 22 |
| Dielectric Strength | — | — | — | — | — | — |
| SSB Volts/μ | 266 | 266 | 268 | 242 | 262 | 175 |
| JIS Volts/μ | 287 | — | 286 | 256 | 286 | — |
| Film Defects No./m$^2$ | — | — | — | — | — | — |
| 192 V/μ | 11 | — | 3 | 38 | 4 | — |
| 220 V/μ | 33 | — | 13 | 144 | 16 | — |
| 246 V/μ | 69 | — | 78 | 325 | 48 | — |
| 268 V/μ | 221 | — | 248 | 752 | 144 | — |
| Winding Characteristics | 0 | — | 0 | — | X | X |
| K | 41.6 | 28.1 | 35.3 | 20.8 | — | — |
| Kt$^{-0.5}$ | 26.3 | 17.8 | 22.3 | 13.2 | — | — |

TABLE 2

FILM PROPERTY COMPARISON

| Example | APP 4 | Comp. 4 | App. 5 | Comp. 5 | App. 6 | Comp. 6 |
|---|---|---|---|---|---|---|
| Nominal Film Thickness μ | 3. | 3.0 | 4.8 | 4.8 | 6.0 | 6.0 |
| Additive Type | CaCO$_3$ | TCP | CaCO$_3$ | TCP | CaCO$_3$ | TCP |
| D50 μ | 1.25 | 1.46 | 1.25 | 1.46 | 1.25 | 1.46 |
| Sharpness Index | 2.4 | 10 | 2.4 | 10 | 2.4 | 10 |
| Additive Loading- Wt % | 0.34 | 0.52 | 0.34 | 0.42 | 0.34 | 0.34 |
| Surface Roughness | | | | | | |
| Ra - μm | 0.156 | 0.080 | 0.135 | 0.114 | 0.111 | 0.100 |
| Rz - μm | 0.899 | 0.910 | 0.860 | 0.826 | 0.752 | 0.680 |
| Rt - μm | 1.048 | 1.250 | 1.156 | 1.190 | 0.950 | 0.970 |
| Protrusion Distribution Index | 6.72 | 11.4 | 6.37 | 7.25 | 6.77 | 6.80 |
| Asperity Density No./cm | 376 | 512 | 378 | 350 | 339 | 282 |
| Air Layer - μ | 0.54 | 0.31 | 0.63 | 0.35 | 0.63 | 0.31 |
| Slip - Degree | 28 | 27 | 25 | 26 | 25 | 25 |
| Dielectric Strength | | | | | | |
| SSB Volts/μ | 336 | 250 | 372 | 333 | 352 | 371 |
| JTS Volts/μ | 328 | 261 | 375 | 360 | 375 | 370 |
| Film Defects | | | | | | |
| 192 v/μ | 1 | 0 | 0 | | | |
| 220 v/μ | 7 | 0 | 0 | | | |
| 240 v/μ | 8 | 0 | 0 | | | |
| 268 v/μ | 26 | 0 | 0 | | | |
| 300 v/μ | | 16 | 0 | | | |
| 340 v/μ | | 25 | 0 | | | |
| 380 v/μ | | 115 | 17 | | | |
| 400 v/μ | | | 43 | | | |
| Winding Characteristics | 0 | — | 0 | — | 0 | — |
| K | 62.8 | 30.7 | 75.3 | 28.5 | 82.2 | 50.3 |
| Kt$^{-0.5}$ | 36.3 | 17.7 | 34.4 | 13.0 | 33.6 | 20.5 |

TABLE 3

FILM PROPERTY COMPARISON BIMODAL

| Example | App. 7 | App. 8 |
|---|---|---|
| Nominal Film Thickness μ | 2.5 | 6.0 |
| Additive Type | CaCO$_3$/Clay | CaCO$_3$/Clay |
| D50 - μ | 1.25/0.55 | 1.25/0.55 |
| Sharpness Index - D90/D10 | 2.4/4.9 | 2.4/4.9 |
| Additive Loading - Wt. % | 0.11/0.30 | 0.06/0.23 |
| Surface Roughness | — | — |
| Ra μm | 0.061 | 0.123 |
| Rz μm | 0.850 | 0.751 |
| Rt μm | 1.127 | 0.971 |
| Protrusion Distribution Index | 13.9 | 6.11 |
| Asperity Density No./CM | 614 | 416 |
| MAH - No./CM$^2$ | 180 | |
| Air Layer - μ | 0.24 | 0.36 |
| Slip Angle - Degrees | 25 | 24 |
| Dielectric Strength | — | — |
| SSB Volts/μ | 315 | 406 |
| JIS Volts/μ | — | |
| Film Defects - no./m$^2$ | — | |
| 192 V/μ | 0 | |
| 220 V/μ | 1 | |
| 246 V/μ | 12 | |
| 268 V/μ | 36 | |
| Winding Characteristics | — | — |
| K | | 33.5 |
| Kt$^{-0.5}$ | | 13.7 |

EXAMPLE 4

Windability of 2.5 micron thick films improved as the concentration of calcium carbonate was increased from 2300 ppm to 3400 ppm to 5000 ppm. Light static impressions observed at the low concentration are not as apparent at the higher concentrations. The film layers were compressed together during winding; however, the films showed excellent gauge accommodation with no visible sign of gauge bands in the wound roll (Gauge bands are visible defects in the film roll associated with regions having compressed film layers of greater film thickness). The excellent gauge accommodation prevents the formation of stretch lanes, a defect observed in thin films in which the sheet flatness is compromised by irreversible film stretching to accommodation the variation in film thickness.

In Tables below excellent gauge accommodation is shown by the improved hardness uniformity of 2.5 micron film containing cubic calcium carbonate compared to conventional film containing tricalcium phosphate for film rolls wound at different winding tensions and speeds.

TABLE

ROLL HARDNESS UNIFORMITY

| NOMINAL Film Thickness μ | 2.5 | 2.5 | 2.5 | 2.5 |
|---|---|---|---|---|
| Additive Type | TCP | CaCO₃ | TCP | CaCO₃ |
| Average Roll Hardness RHO | 77 | 73 | 51 | 54 |
| Minimum - RHO | 71 | 67 | 44 | 52 |
| Maximum - RHO | 85 | 76 | 58 | 57 |
| Variability (_H) - RHO | 14 | 9 | 14 | 5 |

ROLL HARDNESS UNIFORMITY WITH WINDING CONDITIONS

| WINDING SPEED (M/minute) | WINDING TENSION (kg) | _HARDNESS TCP | (RHO)⁻ CaCO3 |
|---|---|---|---|
| 150 | 0.9 | 13 | 1 |
| 200 | 0.9 | 2 | 2 |
| 250 | 0.9 | 10 | 1 |
| 200 | 1.8 | 5 | 2 |

EXAMPLE

Film windability is shown below for film rolls of varying width. Processability, the yield rate of slit rolls, is shown for the 315 width rolls and 7 mm rolls. Slittability of narrow width 7 mm reels on a Dusenberry drum pivoted arm slitter showed a dramatic improvement in yield and processability for 2.5 micron film containing 0.52 weight % cubic calcium carbonate compared to film containing 0.65 weight % tricalcium phosphate. 100% of the film containing calcium carbonate could be slit to full rolls of 16,600 ft without breakage while conventional film containing tricalcium carbonate was unable to be slit to give any complete reels after 5 attempts. Film breakage occurred with the conventional film after 1400, 1400, 1700, 4900 and 7200 feet. The roll edge formation was excellent for the film containing the cubic calcium carbonate while edge weave was noted roll edge formed with the conventional tricalcium phosphate additive

TABLE

Windability and Processability for Slit Rolls

| Film Thickness | 2.5 | 2.5 | 2.5 | 2.5 |
|---|---|---|---|---|
| Additive | CaCO₃ | CaCO₃ | CaCO₃ | TCP |
| Additive Concentration | 0.23% | 0.34% | 0.52% | 0.65% |
| Wound Roll (52 inches) | X | O | O | — |
| Capacitor roll (2.5 inch) | — | O | O | — |
| Slit Roll (315 mm) | — | O | O | — |
| Grade | | 1 | | 3 |
| Slit Roll (7 mm) | — | — | O | X |
| Grade | | | 3 | 5 |

What is claimed is:

1. A roll of film consisting of polyester selected from polyethylene terephthalate and polyethylene naphthalate, said film having a thickness in a range from two to six microns having incorporated therein cubic calcium carbonate having an average diameter in a range of 0.2 to 3.0 microns and a concentration of 0.1 to 2.0 weight % with a proviso that the film has a $Kt^{-0.5}$ of at least 21 wherein K is stack coefficient constant and t is film thickness in microns.

2. The roll of film of claim 1 with a thickness of at least 2.5 microns.

3. The roll of film of claims 1 or 2 with an average surface roughness, Ra, in a range of 0.05 to 0.15 microns.

4. The roll of film of claim 1 wherein the polyester is polyethylene terephthalate with a comonomer of diethylene glycol.

* * * * *